Patented Feb. 28, 1939

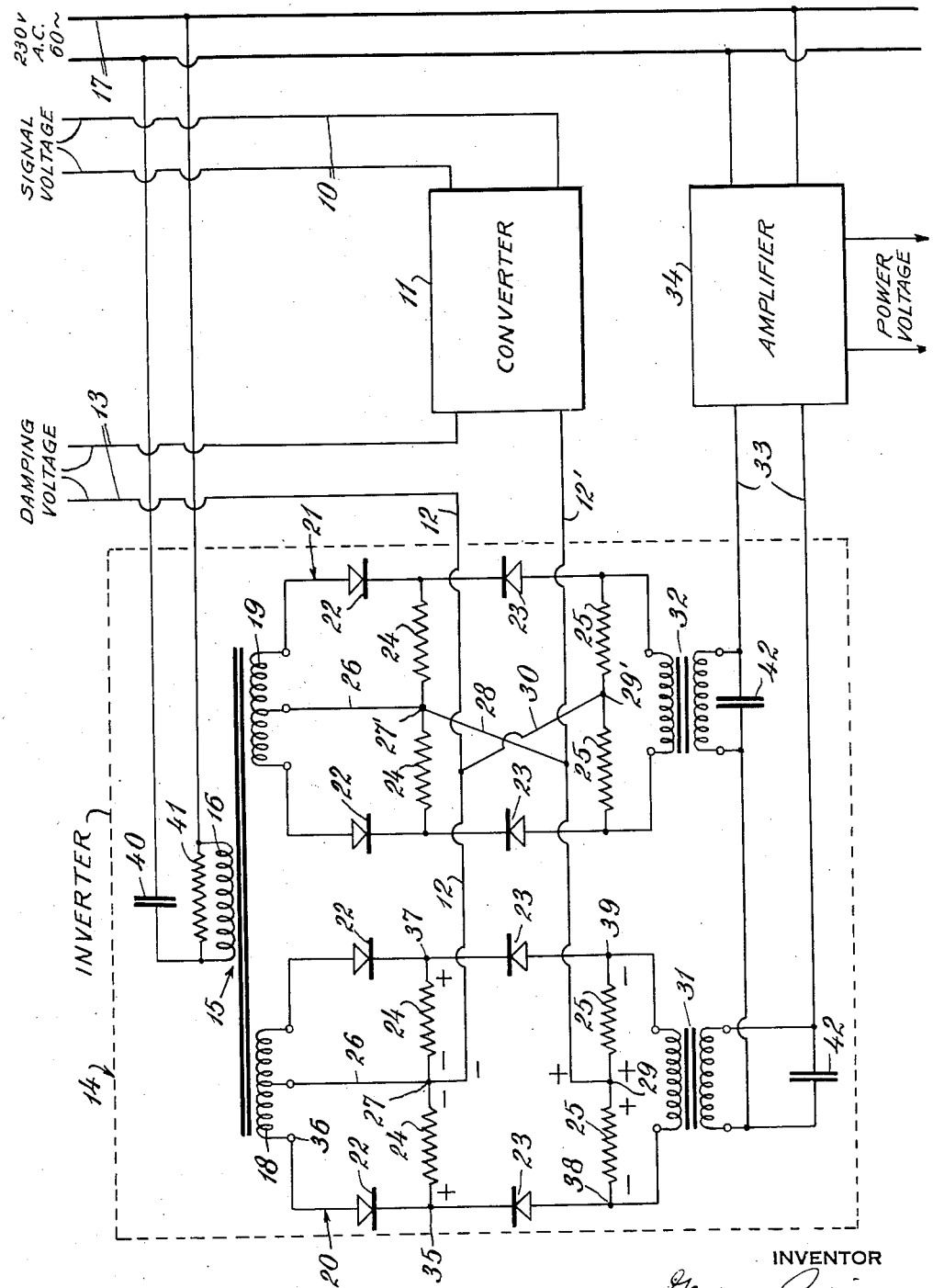

2,148,718

UNITED STATES PATENT OFFICE 2,148,718

INVERTER FOR VARIABLE ELECTRICAL CURRENT

George Agins, Brooklyn, N. Y., assignor to Arma Engineering Co., Inc., Brooklyn, N. Y., a corporation of New York Application November 4, 1938, Serial No. 238,873

8 Claims. (Cl. 175—363)

This invention relates to an inverter for variable electric current and has particular reference to a device for changing a direct current voltage of varying magnitude and reversible polarity into an alternating current voltage of proportional amplitude and reversible phase.

In cases where a direct current voltage of varying amplitude and reversible polarity is to be amplified by means of grid-controlled vacuum tube amplifiers or the like, it is necessary to first reconvert or invert the said voltage into an alternating current voltage of varying magnitude and reversible phase. For example, in the case where the signal impulse is in the form of an alternating current voltage of varying amplitude and reversible phase and is converted into direct current in order that a damping voltage may be conveniently combined therewith, such as the output voltage of a direct current damping generator or the like, it is then desirable to invert the net direct current voltage for the aforementioned purpose.

In accordance with the present invention, a simple device for procuring inversion of a varying direct current voltage into an alternating current voltage of proportional amplitude and reversible phase is provided for adaptation to various purposes.

The inverter of this invention consists essentially of a transformer whose primary winding is supplied with constant potential alternating current and has two secondary windings, each connected to a network including two sets of opposed fixed rectifiers connected in the divided circuits of the secondary windings for transposing and combining alternate half cycles in one circuit and the remaining intermediate half cycles of the full alternating current wave in the other circuit, the opposing rectifiers being so positioned that the potential at one selected terminal is positive and is negative at another selected terminal. The variable direct current voltage to be inverted, such as the converted signal voltage plus damping voltage, is imposed on the two terminals of the inverter and is of less magnitude than the peak rectified voltage in the transformer circuit, so that current can flow in the output only when the input voltage is in the proper direction, and when the instantaneous rectified voltage is less than the input voltage, which occurs during the half cycle interval when the current is blocked by the opposing rectifiers. Current accordingly flows alternately through resistors connected to the positive input terminal, thus providing an alternating voltage which is preferably impressed on the primary winding of an input transformer of the amplifier. Condensers are provided for by-passing the higher harmonics to improve the wave shape so that the output voltage of the inverter will be approximately sinusoidal in character.

The variable direct current input is connected in the reverse manner to the two halves of the inverter, so that each half accommodates one polarity of input. The output of the second half of the inverter is also impressed on the primary winding of an input transformer of the amplifier, the secondary voltages of both transformers being added and impressed on the grid circuit of the amplifiers. The current supply for the inverter and the amplifiers is connected to the same source and the inverter supply is provided with a phase-shifting network to insure that the alternating current voltage applied by the inverter to the grids of the amplifier is of proper phase to secure proper operation of the grid-controlled rectifier.

For a more complete understanding of the invention, reference may be had to the accompanying drawing, which illustrates diagrammatically the circuit arrangement of the variable direct current inverter of this invention.

As illustrated in this drawing, the alternating current signal voltage of varying amplitude and reversible phase is supplied at 10 to a converter 11, which may be of any desirable construction for converting the alternating current signal voltage into direct current of proportional magnitude and reversible polarity. Connected in one of the output leads 12, of the converter 11 are wires 13 from a direct current generator or the like connected to the object being controlled, and responsive to varying movements or oscillations thereof for generating a direct current damping voltage which is added to the output of the converter 11. Damping voltages otherwise developed, such as in response to the time rate of change of the signal or the like, or other direct current voltages from any other source may be added in the same or similar way. The output of the converter thus modified is supplied to the inverter 14.

The inverter 14 includes a transformer 15, whose primary winding 16 is supplied from an alternating current source 17. This transformer has two secondary windings 18 and 19, each connected to a network 20 and 21, respectively, comprising fixed rectifiers 22 and 23 and resistors 24 and 25, the rectifiers preferably being of the copper oxide type. The center tap of each secondary winding 18 and 19 is connected by wire 26 to respective terminals 27 and 27' between resistors 24. The terminals 27 and 27' are connected to the input wires 12, 12', respectively, i. e. terminal 27 of network 20 is connected to the input wire 12, while terminal 27' of network 21 is connected to input wire 12' by wire 28. Similarly, wire 12' is directly connected to terminal 29 between resistors 25 of network 20, while wire 12 is connected by wire 30 to the terminal 29' between resistors 25 of network 21.

The two networks 20 and 21 are connected by respective transformers 31 and 32 to the leads 33 of the amplifier 34, which is preferably of the grid-controlled vacuum tube type. The secondary windings of the transformers 31 and 32 are connected so that their voltages subtract and condensers 42 are provided to improve the wave shape by by-passing the higher harmonics.

In operation, and considering one network 20, since both networks operate in the same way, the rectifiers 22 serve to rectify the alternating current voltage impressed across the secondary winding 18 of the transformer 15. The rectification process impresses the alternating current voltage, which exists across the midtap terminal 26 and the outer transformer terminal 36, on one of the rectifiers 22 and one of the resistors 24 in series. Each rectifier 22 is so arranged that when a voltage of a selected polarity is applied to it, its resistance is negligible, while for the opposite polarity its resistance is practically infinite. Thus, current flows through the series rectifier circuit described above only during the half cycle of impressed voltage which is of the selected polarity. As a consequence, alternate half-cycles of alternating current voltage appear across the points 35, 27 at each extremity of the resistor 24 when current flows in the circuit. The other rectifier 22 and resistor 24 are so connected that by a similar process, the intermediate half-cycles of alternating current voltage appear across the terminals 37, 27 of the other resistor 24, with polarity as indicated in the drawing. Current flowing in the rectifiers 22 is kept out of the resistors 25 by the blocking action of the valves 23, which are connected oppositely to the rectifiers 22.

The converter output including damping, is applied across the points 27, 29, point 27 being the junction point of the two resistors 24, and 29 being the junction point of the two resistors 25. The magnitude of the voltage across 27, 29 is much less than the peak value of either of the half-cycles which appear alternately across 35, 27 and 37, 27 respectively. Thus current can flow through one of the resistors 25 only when the voltage across 27, 29 is greater than the instantaneous voltage across the corresponding resistor 24, and when its polarity is such as to cause the valve 23 to permit the passage of electric current. The former condition obtains during those half-cycle intervals when the rectifier 22 blocks the passage of current from the transformer 18 so that no voltage exists across the corresponding resistor 24.

Current accordingly flows alternately from 26 to 38 and then from 29 to 39, providing, because of resistors 25, an alternating voltage across 38, 39. Inasmuch as the converter output leads 12, 12' are connected in a reverse manner to the network 21 by cross-connections 28, 30, and since the secondaries of transformers 31, 32 are connected so that their voltages are of opposite phase, a signal of polarity such as is indicated on the drawing, will cause an alternating voltage of a given phase to be applied in circuit 33 by means of transformer 31, the voltage applied through of transformer 32 being zero. Conversely, a signal of polarity opposite to that indicated on the drawing, will cause an alternating voltage of opposite phase to be applied in circuit 33 by means of transformer 32, the voltage applied through transformer 31 being zero. The output of the inverter 14 is therefore alternating current having an amplitude proportional to that of the output of the converter 11 plus damping and whose phase reverses when the polarity of the output signal reverses.

Inasmuch as in the operation of grid-controlled amplifiers the phase of the alternating current voltage applied to the grids is important, and, inasmuch as the phase of the alternating current output of the inverter 14 depends upon the phase of the voltage impressed upon the primary winding 16 of input transformer 15, condenser 40 and resistance 41 are provided in the circuit of primary winding 16 to serve as a phase-shifting network, the transformer 15 supply being the same as that for the conventional plate transformer of the amplifier.

I claim:

1. An inverter for changing a direct current voltage of varying magnitude and reversible polarity from a selected source into an alternating current voltage of proportional amplitude and reversible phase, comprising an output transformer, a source of alternating current, means connected to the alternating current source and the output transformer for resolving each alternating current wave from said alternating current source into its component alternations about a common point of fixed polarity, a connection from the direct current source to the said common point, and means including a second connection from the direct current source to the resolving means for continuously adding a direct current voltage to each said component alternation, whereby reversing pulsations of direct current are directed through the primary winding of the output transformer for providing a proportional alternating current at the secondary winding thereof.

2. An inverter for changing a direct current voltage of varying magnitude and reversible polarity from a selected source into an alternating current voltage of proportional amplitude and reversible phase, comprising an output transformer, a source of alternating current, means connected to the alternating current source and the output transformer for resolving each alternating current wave from said alternating current source into its component alternations about a common point of fixed polarity, a connection from the direct current source to the said common point, means including a second connection from the direct current source to the resolving means for continuously adding a direct current voltage to each said component alternation, and uni-directionally conductive valves in the said last connection, whereby reversing pulsations of direct current are directed through the primary winding of the output transformer whenever the direct current source is of a predetermined polarity for providing a proportional alternating current at the secondary winding thereof.

3. An inverter for changing a direct current voltage of varying magnitude and reversible polarity from a selected source into an alternating current voltage of proportional amplitude and reversible phase, comprising an output transformer, a source of alternating current, two resistors connected in parallel with the primary winding of the said output transformer, means connected to the alternating current source and to one of the said resistors for resolving each alternating current wave from said alternating current source into its component alternations about a common point of fixed polarity on said one resistor, a connection from the direct current source to the said common point, a second connection from the direct current source to a common point on the second resistor for continuously adding a direct current voltage to each said component alternation, and a uni-directionally conductive valve in each of the connections between each of the said resistors and the said resolving means, whereby reversing pulsations of direct current are directed through the primary winding of the output transformer whenever the direct current source is of a predetermined polarity for providing a proportional alternating current at the secondary winding thereof.

4. An inverter for changing a direct current voltage of varying magnitude and reversible polarity from a selected source into an alternating current voltage of proportional amplitude and reversible phase, comprising a source of alternating current, an input transformer having a primary winding supplied from the said alternating current source, an output transformer, two sets of series resistors connected in parallel with the primary winding of said output transformer, means connected to the secondary winding of the said input transformer and to the said pair of resistors for resolving each alternating current wave from said alternating current source into its component alternations about a common point of fixed polarity on one of said resistors, a connection from the direct current source to the said common point, a second connection from the direct current source to a common point on the second of said resistors for continuously adding a direct current voltage to each said component alternation, and a uni-directionally conductive valve in each of the connections between said sets of resistors and the said resolving means, whereby reversing pulsations of direct current are directed through the primary winding of the output transformer whenever the direct current source is of a predetermined polarity for providing a proportional alternating current at the secondary winding thereof.

5. An inverter for changing a direct current voltage of varying magnitude and reversible polarity from a selected source into an alternating current voltage of proportional amplitude and reversible phase, comprising a source of alternating current, an input transformer having a primary winding supplied from the said alternating current source and having a midtap on its secondary winding, an output transformer, a pair of series resistors connected in parallel with the primary winding of the said output transformer, a second pair of series resistors connected in parallel with the secondary winding of the said input transformer and the said first pair of resistors, means in each of the connections between the said second pair of resistors and the secondary winding of the said input transformer for resolving each alternating current wave from said alternating current source into its component alternations about the common connection of the two resistors in the said second pair, whereby the said common point is maintained at a fixed polarity, a connection from the direct current source to the said common point and to the said secondary midtap of said input transformer, a second connection from the direct current source to a common point on the said first pair of resistors for continuously adding a direct current voltage to each said component alternation, and a uni-directionally conductive valve in each of the connections between the said first pair of resistors and the said second pair of resistors, whereby reversing pulsations of direct current are directed through the primary winding of the output transformer whenever the direct current source is of a predetermined polarity for providing a proportional alternating current at the secondary winding thereof.

6. An inverter for changing a direct current voltage of varying magnitude and reversible polarity from a selected source into an alternating current voltage of proportional amplitude and reversible phase, comprising a source of alternating current, an input transformer having a primary winding supplied from the said alternating current source and having a midtap on its secondary winding, an output transformer, a pair of series resistors connected in parallel with the primary winding of the said output transformer, a second pair of series resistors connected in parallel with the secondary winding of the said input transformer and the said first pair of resistors, a uni-directionally conductive valve in each of the connections between the said second pair of resistors and the secondary winding of the said input transformer for resolving each alternating current wave from said alternating current source into its component alternations about the common connection of the two resistors in the said second pair, whereby the said common point is maintained at a fixed polarity, a connection from the direct current source to the said common point and to said secondary midtap of said input transformer, a second connection from the direct current source to a common point on the said first pair of resistors for continuously adding a direct current voltage to each said component alternation, a uni-directionally conductive valve in each of the connections between the said first pair of resistors and the said second pair of resistors, the last-named valves being oppositely connected to the first-named valves, whereby reversing pulsations of direct current are directed through the primary winding of the output transformer whenever the direct current source is of a predetermined polarity for providing a proportional alternating current at the secondary winding thereof.

7. An inverter for changing a direct current voltage of varying magnitude and reversible polarity from a selected source into an alternating current voltage of proportional amplitude and reversible phase, comprising a source of alternating current, an input transformer having a primary winding supplied from the said alternating current source, an output transformer, a first pair of series resistors connected in parallel with the primary winding of said output transformer, means connected to the secondary winding of the said input transformer and to the said first pair of resistors for resolving each alternating current wave from said alternating current source into its component alternations about a common point of fixed polarity, a connection from the direct current source to the said common point, a second pair of series resistors connected in parallel with the primary winding of said output transformer, a second connection from the direct current source to a common point on the said second pair of resistors for continuously adding a direct current voltage to each said component alternation, a uni-directionally conductive valve in each of the connections between the said pairs of resistors and the said resolving means, whereby reversing pulsations of direct current are directed through the primary winding of the output transformer whenever the direct current source is of a predetermined polarity for providing a proportional alternating current at the secondary winding thereof, and a condenser and a resistance interposed between said alternating current source and the primary winding of said input transformer for shifting the phase of the alternating current supplied thereto.

8. An inverter for changing a direct current voltage of varying magnitude and reversible polarity from a selected source into an alternating current voltage of proportional amplitude and reversible phase, comprising a source of alternating current, an input transformer having a primary winding supplied from the said alternating current source and having two secondary windings, two output transformers, means connected respectively to each input transformer secondary winding and each output transformer primary winding for resolving each alternating current wave from said alternating current source into its component alternations about a common point of fixed polarity, connections from the direct current source to each of said common points, means including second connections from the direct current source to each said resolving means for continuously adding a direct current voltage to each said component alternation, each said common point and its corresponding resolving means being reversely connected to the direct current supply, whereby reversing pulsations of direct current are directed through the primary winding of one output transformer whenever the direct current source is of a predetermined polarity, and through the primary winding of the second output transformer when the polarity is reversed for providing an alternating current whose magnitude is proportional to the magnitude of the direct current source and whose phase reverses as the polarity of the direct current reverses.

GEORGE AGINS.